Nov. 17, 1959   J. H. HOERN   2,912,892
CONTINUOUS BORING AND TURNING MACHINES
Filed Aug. 29, 1955   3 Sheets-Sheet 1

INVENTOR.
JOSEPH H. HOERN.
BY
*Seurmont Grarman*
ATTORNEYS

Nov. 17, 1959 J. H. HOERN 2,912,892
CONTINUOUS BORING AND TURNING MACHINES
Filed Aug. 29, 1955 3 Sheets-Sheet 3

INVENTOR.
JOSEPH H. HOERN.
BY
*Fearman & Fearman*
ATTORNEYS

United States Patent Office 2,912,892
Patented Nov. 17, 1959

2,912,892

CONTINUOUS BORING AND TURNING MACHINES

Joseph H. Hoern, Saginaw, Mich.; assignor of small interests to various assignees Application August 29, 1955, Serial No. 531,039

11 Claims. (Cl. 82—3)

This invention relates to continuous boring and turning machines of a type which can machine irregular work surfaces and the like, and more particularly to certain novel and useful improvements therein.

Broadly, the machine comprises a rotary table or frame in which a plurality of work holding revolving chucks are provided adjacent tool slides which are capable of taking contour cuts.

One of the prime objects of the instant invention is to design a multiple spindle, precision, boring and turning machine of station type design which incorporates simpler and more reliable mechanism for controlling the intricate cuts it is possible to take at the various stations.

Another object of the invention is to provide a machine of this type which is compact in design considering the wide variety of operations which it is capable of performing, the various operable elements being integrated in a manner to accomplish this result and also to provide a machine which can be very readily assembled and later disassembled for repair and for renewal of parts.

A further object of the invention is to design a machine which is capable of economically boring or turning intricate work surfaces of irregular configuration to precision tolerances on a mass production scale.

Another object of the invention is to design a machine of the type described capable of simultaneously machining a plurality of work pieces in which the movement of all of the vertical slides at the various stations may be conveniently controlled by a single cam, and the movement of all of the lateral slides can likewise be controlled by a single cam.

A further object of the invention is to design a continuous machine such as described in which the tools are capable of vertical and lateral movement or any combination or variation thereof, the path and pattern of movement of the tools being readily changeable to adapt to the machining of work surfaces of differing configuration by merely substituting different cams in the machine.

Another object of the invention is to design a machine in which fluid pressure means reliably maintain a constant pressure of desired intensity on the lateral and vertical tool feeding slides to minimize cutting vibrations and permit compliance with close tolerance requirements.

A further object of the invention is to provide a continuous boring and turning machine of this type which permits the rapid and efficient loading and unloading of the workpieces at one of the stations without interrupting the machining operations at the other stations.

Another object of the invention is to provide a turning and boring machine in which the means for driving the spindles is supported on the stationary base of the machine and the spindle carrier revolves with respect thereto.

A further object of the invention is to provide a machine as above described in which means are provided for taking up the variable slack created in the spindle drive belt or belts as the spindle carrier revolves and, in which the spindles leave the belt at an unloading station and are braked by means with respect to which the spindle carrier revolves.

A still further object of the invention is to provide a turning and boring machine of the character described which is extremely practical in design and can be relatively easily and economically manufactured.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

Figure 1:
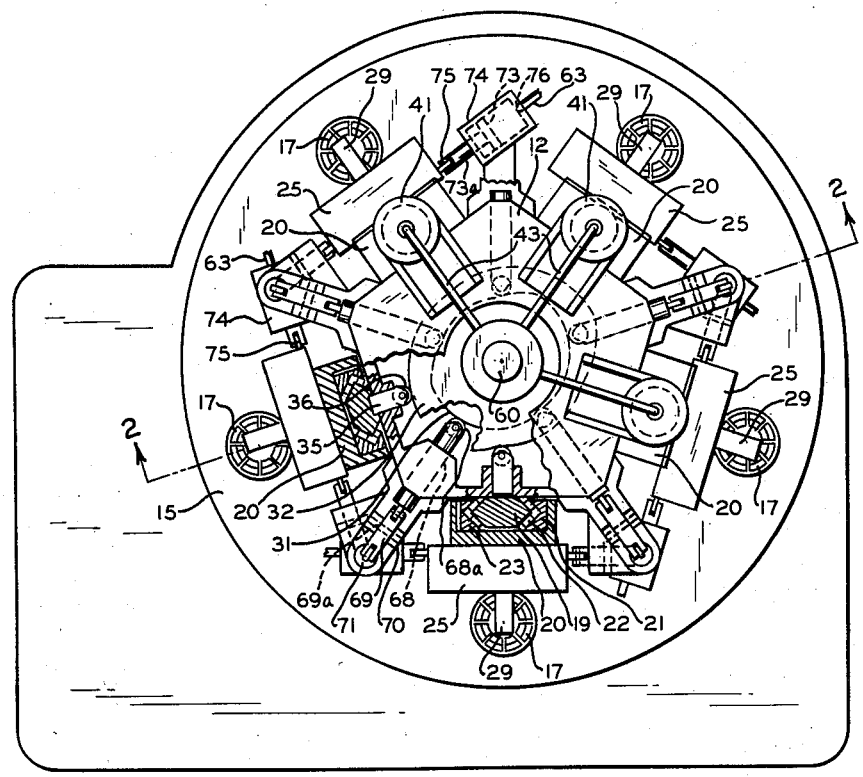
Fig. 1 is a top plan view of the machine with portions thereof broken away to illustrate the manner in which the tool slides are controlled.
Figure 5:
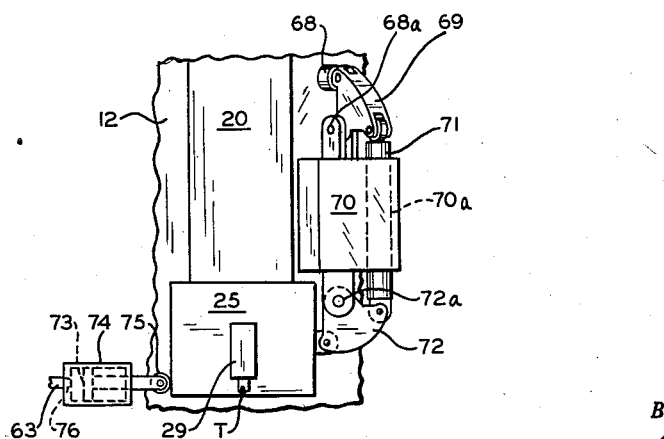
Fig. 5 is an enlarged fragmentary side elevational view illustrating more particularly the manner in which the lateral tool slides are controlled.

Referring now more particularly to the accompanying drawings in which I have shown a preferred embodiment of my continuous boring and turning machine, a numeral 10 generally indicates the base of the machine which is as shown, provided with an integrated tubular column section 11. Revolvably mounted on the column 11 is a multi-station tool slide carrier 12 and roller bearings 13 and 14 are provided between the elements 11 and 12 as shown. A work table or spindle carrier 15 is secured to carrier 12 to rotate therewith and provided in circumferentially spaced openings 16 in the table 15 are spindles 16a on which diaphragm type chucks 17 or other suitable workholders are mounted. A chuck which may be conveniently employed is the one shown in Fig. 4 in which a push rod 18 extending up through the tubular spindle 16a may be pushed upwardly at the front of the machine to load the diaphragm 17a of the chuck in a manner which will be later described to spread the jaws thereof and release the workpiece W held therein.

Rigidly mounted on the various faces of the tool slide carrier, which is shown as pentagonal in cross section, are a plurality of slide guides 19 (Fig. 1) which support the vertical channel shaped slides 20. The latter slides 20 are provided with ways 21 which are separated from the guides 19 by roller bearings 22 mounted in a suitable cage (not shown). Plainly, the slides 20 will move evenly and smoothly on the guides 19 with a minimum of frictional resistance and any side play may be eliminated by adjusting the tapered gibs 23.

Mounted laterally or crosswise on the vertical slides 20 are similar guides 24 (Fig. 2) which carry channel shaped cross slides 25. As with the vertical slide arrangement the slides 25 are provided with ways 26 which are separated from the guides 24 by roller bearings 27 mounted in suitable cages. Tapered gibs 28 are also employed as before to eliminate any side play and minimize vibration created by the cutting tools T which are mounted in toolholders 29 on the cross slides 25. It will be observed that the slides 20 and 25 house or enclose the guides on which they are mounted.

Supported on the column 11 is a stationary tubular cam carrier 30 having a hub 30a which is received in the interiorly shouldered upper end 11a of the column 11.

The cam carrier 30 has a flange 30b which protects the bearing 13 and is shouldered as at 30c to support the cam 31 which controls the movement of the cross slides 25. Mounted between the cam 31 and a shoulder 30d on the carrier 30 is a cam 32 for controlling the movement of the vertical slides 20.

Recesses 33 are provided in the carrier 12 to house tappet holders 34 which support radially movable tappets 35, the tappets having follower rollers 36 which are maintained in engagement with the cam 32 and are controlled thereby. It will be observed that the enclosing slides 20 are of greater length than the guides 19 and mounted in the upper ends of the slides 20 are generally T-shaped bell crank levers 37 which are pivotally supported on the tool slide carrier 12 at 38 within the recesses 33 and have their opposite ends in engagement respectively with the ends of the tappets 35 and the plates 39 which are fixed to the upper ends of the channel shaped slides 20. The slides 20 are fed downwardly as permitted by the cam 32 by fluid pressure actuated plungers or pistons 40 which are housed within cylinders 41, the plates 39 being fixed to the lower ends of the piston rods 40a in any suitable manner. Not only are the tools thus positively fed during the cutting operation so that cutting vibrations are minimized, but plainly also the fluid pressure actuated plungers 40 positively maintain the tappet rollers 36 in engagement with the cam 32. The cylinders 41 are integrated with brackets 41a which may be supported on the upper wall of the carrier 12 and openings 42 in the upper walls of the cylinders 41 receive the fluid pressure supply lines 43. The lines or hoses 43 lead from a seal housing 59 which encloses a tubular manifold section 60 of the cam carrier 12 and rotates thereon. A supply pipe 61 leading up centrally through the base 10 and column 11 of the machine is threaded into the vertical passage 62 and compressed air or the like is supplied through the manifold 60 which has communication with the lines 43 and other lines 63 which will be further identified through lateral ports 64. Seals 65 between members 59 and 60 prevent leakage of the pressure fluid. The seal housing 59 is secured to the carrier 12 to rotate therewith by a torque arm 66 which insures that the housing 59 will not lag relative to carrier 12 in its rotation.

Figure 2:
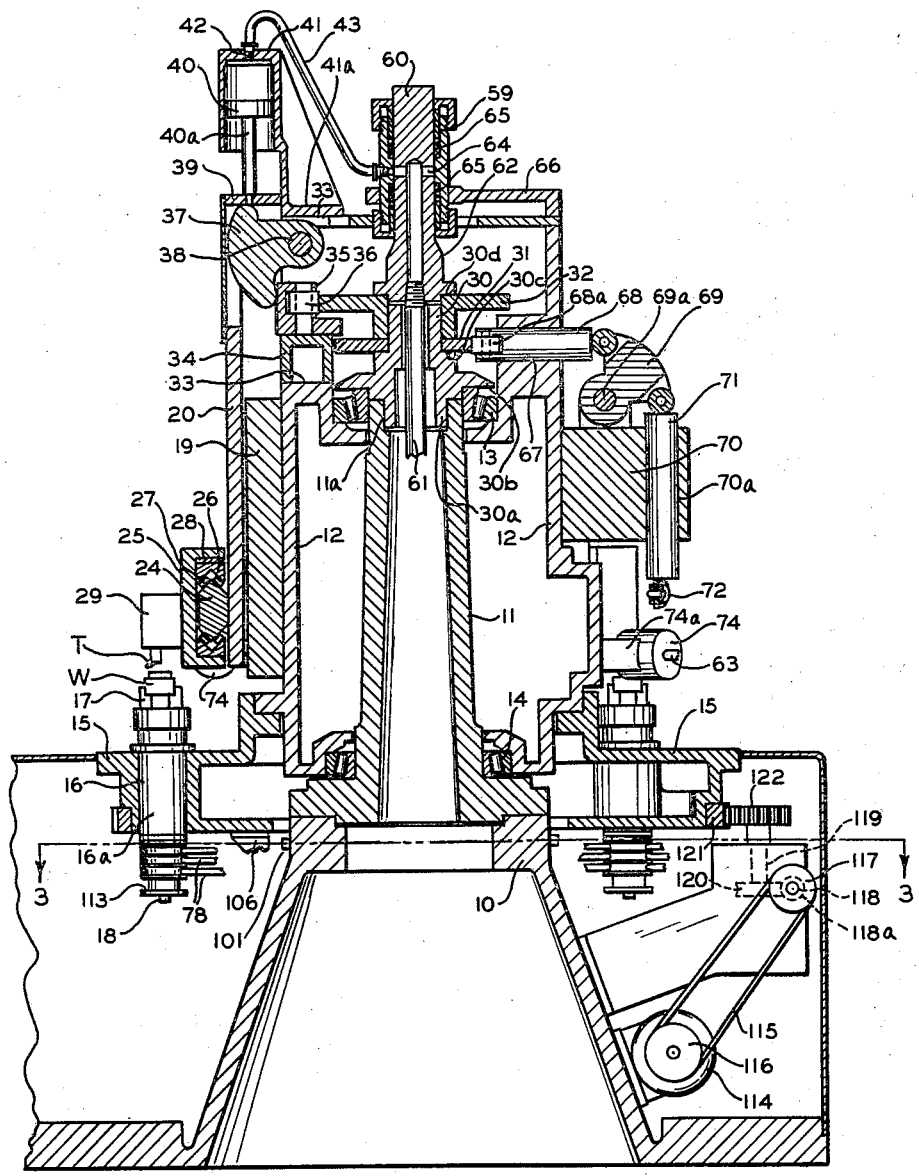
Fig. 2 is a sectional side elevational view taken on the line 2—2 of Fig. 1.

Provided in circumferentially spaced recesses 67 in the tool slide carrier 12 below the recesses 33 are tappets 68 which have follower rollers 68a in engagement with the cam 30. The tappets or slides 68 actuate angularly disposed bell crank levers 69, pivotally mounted at 69a on brackets 70, which are in engagement with vertical slides 71 in the slide bearings 70a provided in brackets 70 and as shown in Fig. 2 angularly disposed bell crank levers 72 pivotally mounted at 72a on the carrier 12 transmit the motion of the levers 72 to the cross slides 25. The slides 25 are moved laterally or transversely by pistons or plungers 73 in pressure fluid cylinders 74 as permitted by cam 30, the plunger rods 73a being slotted at their outer ends to receive rollers 75 which bear on the ends of the slides 25 as shown. Brackets 74a are provided on the tool slide carrier 12 to support the cylinders 74, and the fluid pressure lines 63 lead into openings 76 in the ends of the cylinders 74 and communicate with the passages 64 in manifold 62 in the same manner as do lines 43.

Figure 3:
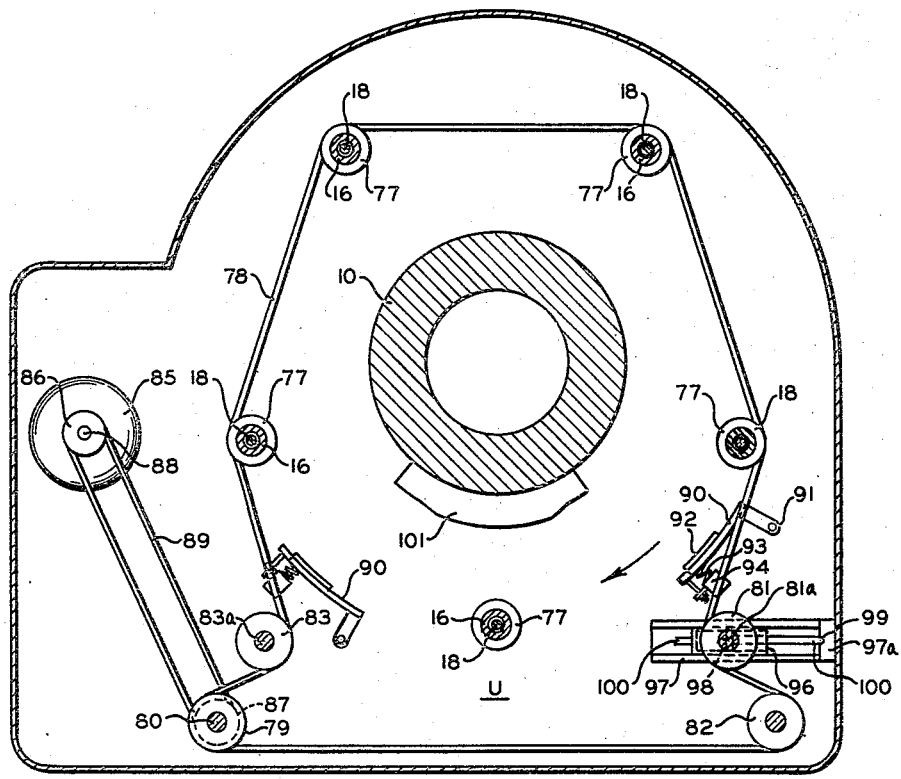
Fig. 3 is a sectional plan view taken on the line 3—3 of Fig. 2 illustrating the manner in which the work holding spindles are driven.

The spindles 16 which move with the revolving table 15 have drive pulleys 77 (Fig. 3) on the lower ends thereof and continuous belts 78, which are driven from a pulley 79 on a counter shaft 80 journaled in a suitable bearing in the stationary base 10 of the machine, may be trained around the spindles as indicated in Fig. 1. Idler pulleys 81, 82, and 83 mounted on shafts 81a–83a which are journaled in suitable bearings on the base 10 are located as shown to provide an area at the front of the machine where the spindles leave the belts 78. A motor 85 vertically supported on the base 10 drives shaft 80, pulleys 86 and 87 being provided on the armature shaft 88 of the motor and shaft 80 respectively and a belt 89 being trained therearound.

Shortly after the spindle 16 leaves the belts 78 at the front of the machine to enter the unloading-loading area U, it comes into engagement with a brake arm 90 which is pivotally mounted on the base 10 of the machine at 91 and has a brake lining or shoe 92 thereon bearing against the spindle 16 as it passes and stopping it. A spring 93 mounted in a cup 94 on the base 10 urges the shoe 92 inwardly into position to be engaged by the spindle and the load thereon is such that the revolution of each spindle will be braked to a complete stop by the time the carrier 12 brings it past the arm 90. After the spindle is unloaded and reloaded in a manner which will be described it must pass a second brake arm 90' opposite that above discussed before again engaging the belts 78. The latter brake arm which is identical with the one first described and whose parts are for convenience sake numbered identically is employed for the purpose of braking the spindle if, after it is again engaged by the belts 78, it is decided to reverse the direction of rotation of carrier 12 and back the spindle into the unloading-loading area 11 to adjust the work in the chuck or the like.

Since the belts 78 are mounted on the base 10 while the spindles 16 revolve with the carrier 12 and in view of the fact that the belt is driving four spindles at times and three spindles at other times as the carrier 12 revolves, the tension on belts 78 will not be constant. Accordingly, to prevent slippage the shaft 81a is secured to a reciprocable fluid pressure cylinder 96 mounted in a slide 97 on the base 10. A piston 98 in the cylinder 96 has its piston rod received in a recess 99 in the one end wall 97a of the U shaped slide 97 so that it remains stationary while the cylinder moves with relation to it. A predetermined constant air pressure or the like sufficient to pre-tension the belts 78 to the desired degree when three spindles are being driven is maintained in one end of the cylinder 96 through a supply line 100 connected with a suitable source such as pipe 61 and when the belt 87 engages four spindles the take up idler 81 is automatically moved outwardly to slack the belt sufficiently so that it does not bind.

Figure 4:
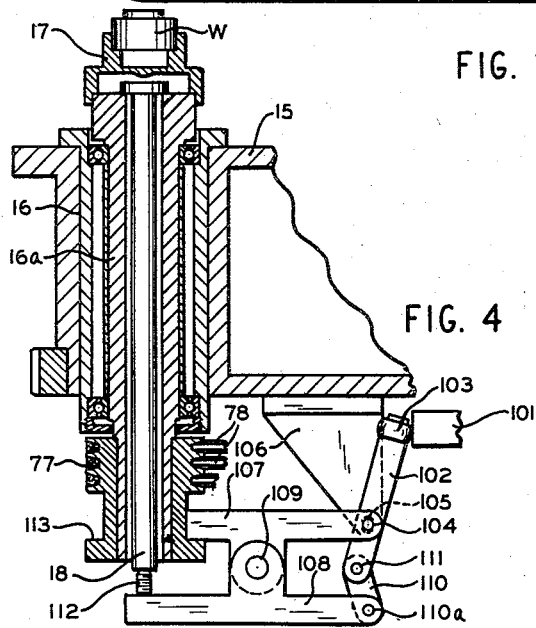
Fig. 4 is an enlarged sectional view of one of the spindles showing the mechanism for opening the jaws of the chuck thereof.

In order to spread the jaws of a chuck 17 at the unloading-loading area or station U, an annular cam 101 is provided on the base 10 as shown in Figs. 2 and 4 and articulated lever arrangements at the various spindles which travel with the slide carrier table 15 are in engagement with the cam 101. As the spindle 17 leaves the brake arm 90 the lever mechanisms spread the jaws of the chuck so that the operator can unload the completed workpiece and reload another workpiece. The arrangement at each spindle comprises a lever 102 having a roller 103 thereon which rides against the cam 101, the lever 102 having a pivot pin 104 which is received in a slot 105 in a bracket 106 supported under the spindle carrier 15. A pair of generally parallel horizontal levers 107 and 108 which are pivotally joined at 109 are also pivotally joined to the pin 104 and the lower end at (110a) of a link 110 respectively, the latter link 110 being pivotally connected as at 111 to the lower end of lever 102. A pin 112 on each lever 108 has engagement with the push rod 18 of the adjacent chuck and, when a rise on cam 101 causes the lower end of lever 102 to move inwardly at the front of the machine so that the inner ends of levers 107 and 108 tend to be spread apart, the outer ends of the levers will tend to converge and pin 112 will exert a sufficient upward pressure on the push rod to spread the jaws of the chuck at the same time the lever 107 bears downwardly on the flange 113 of the spindle to equalize the forces applied to the spindle and relieve the pressure which would otherwise be imposed on the spindle bearings. The cam 101 will keep the jaws of the chucks open long enough for the operator to have ample time for unloading and reloading.

The spindle carrier 15 and accordingly the tool carrier 12 is driven from a motor 114 (Fig. 2) which is mounted on the base 10 of the machine as shown. A belt 115 is trained around the motor pulley 116 and around a pulley 117 on a worm shaft 118. The worm gear 118a on shaft 118 drives a countershaft 119 through a worm wheel 120 and the carrier 15 which has a ring gear 121 thereon is driven from a gear 122 on the upper end of shaft 119.

In operation the spindle table 15 and accordingly the tool slide carrier 12 are continuously revolved at a relatively slow rate of speed by the motor 114. The work holding spindles 16 are revolved at a relatively high rate of speed by the belts 78 which are driven as described by motor 85. The cam 32 is so designed that the slides 20 are permitted to begin feeding down toward the work pieces just prior to the time the latter are reengaged by belts 78 after leaving the unloading-reloading area U. As the particular spindle is engaged by belts 78 it is rapidly brought up to cutting speed and thereafter during the course of its travel around to the area U again the adjacent slides 20 and 25 are controlled by the cams 30 and 32 to machine the workpiece carried by the spindle to the desired configuration. Since the slides 25 are mounted on slides 20 obviously multifarious contour cuts may be taken.

The cuts taken by each tool T are, of course, identical and obviously the instant machine is conducting a plurality of cuts on a plurality of workpieces simultaneously. In the instant machine the tool slides are independently controlled from a single positive source (the cam carrier 30) yet clearly the speeds of travel, degrees of travel, and directions of travel of the vertical and lateral slides are entirely independent one of the other. The slides 20 are controlled by the cam 32 which permits the bell cranks 37 to swing downwardly and the pistons 40 to push the slides 20 downwardly when the tools T are to be fed to and into the work. When the tools T are to be moved in the reverse direction and retracted, the cam 32 swings the bell cranks 37 upwardly which retracts the slides 20. Similarly the slides 25 are moved from left to right in Fig. 1 when the cam 30 permits the pistons 73 to move the bell cranks 72 and 69 upwardly and will be moved from right to left when the cam 30 swings the bell cranks 69 and 72 downwardly.

By the time the cut has been completed, a given spindle has traveled around to the right front portion of the machine and leaves the belts 78. There it engages the brake arm 90 and its axial revolution is immediately halted so that the workpiece is no longer spinning when the pushrod 18 of the chuck is pushed upwardly by the linkage 102, 110, 108, and 112 in engagement with cam 101. When the spindle leaves the belts 78 as above mentioned, only three spindles will be in driving engagement with belts 78, and idler pulley 81 moves inwardly to take up the slack. When four spindles are again momentarily reengaged after the above spindle has reached the front of the unloading-reloading area U, the increased pressure on the belts 78 overcomes the pressure of the fluid in cylinder 96, and the pulley 87 moves outwardly again. As has been noted, the cam 101 holds the jaws of a chuck 17 open for a sufficient length of time so that the operator can easily complete the unloading-reloading operations.

It should be apparent that I have perfected a greatly improved turning and boring machine which is extremely practical in design and offers many important advantages over known machines of its type. It is to be understood that in all cases the foregoing descriptive text and drawings are to be taken as merely illustrative of the invention rather than in any ways limiting, since it is contemplated that various equivalent changes may be made in the various elements comprising the device to achieve similar results without departing from the spirit of the invention or the scope of the subjoined claims.

I claim:

1. In a machine tool, a frame, a pair of superposed cams thereon, a carrier rotatable about said cams, circumferentially spaced work supporting spindles on said carrier, vertical slides on said carrier adjacent the spindles, horizontal tool supporting slides carried by said vertical slides, means riding on one of said cams in engagement with said vertical slides for controlling movement thereof, means independent of said first means and out of operative engagement therewith riding on the other cam in engagement with said horizontal slides for controlling their movement, and means on said frame driving said spindles.

2. In a machine tool, a frame having a vertically extending cam carrying section thereon, superposed cams on said section, a concentrically disposed carrier revolvable about said section, circumferentially spaced work supporting spindles on said carrier, vertical slides on said carrier adjacent and above said spindles, horizontally disposed tool supporting slides carried by said vertical slides, tappets in said carrier opposite each vertical slide and in engagement with one of said cams, T shaped bell crank levers each having a lower leg in engagement with one of said tappets, and an upper leg bearing against said vertical slides, fluid pressure actuated plungers normally forcing said vertical slides downwardly to maintain the bell crank in engagement with the tappets and the latter in engagement with the cam and feed the slides to the spindles as permitted by the said cam, tappets in said carrier opposite an end of each horizontal slide in engagement with the other of said cams, bell crank lever means transmitting the movement of said tappets in one direction to said horizontal slides, fluid pressure actuated plungers moving the horizontal slides in the opposite direction as permitted by said other cam, and an endless drive means on said frame trained around said spindles for collectively driving the same.

3. The combination defined in claim 2 in which said cam carrying section is tubular, ports therein, a seal connected with said carrier revolving on said cam carrying member and enclosing said ports, fluid pressure cylinders for said plungers, fluid pressure lines connecting the interior of said seal at said ports with said cylinders, and a fluid pressure supply line for said cam carrying section.

4. The combination defined in claim 2 in which chucks having push rods for opening the same are mounted on said spindles for holding the work on said carrier, a cam on said frame, and follower linkage in engagement with said cam actuating said push rods to open the chucks at a predetermined point in the revolution of said carrier.

5. In a machine tool, a frame, a carrier rotatable thereon, circumferentially spaced, rotary work supporting spindles movable with said carrier, pulleys on said frame and on said spindles, an endless belt trained therearound, said pulleys being spaced at one side of the frame outwardly of the path of revolution of said spindles on the carrier so that said spindles leave the belt at the said side of the frame and thence move back into engagement with the belt, tool slides feedable to and from the spindles, one of said pulleys being slidably mounted, and pressure means which normally holds said pulley in position to take up the slack when a given number of spindles are engaged by said belt, but permits it to move outwardly when more spindles are in driving engagement.

6. The combination defined in claim 5 in which a brake member is mounted on the frame at substantially the point where the said spindles leave the belt in the said path of the spindles to stop the rotation thereof and permit unloading and reloading of the work after the spindles leave the belt, a cam is provided on said frame about which said carrier revolves, chucks on said spindles for holding the workpieces, and means in engagement with said cam and controlled thereby for opening said chucks after said spindles have been stopped by the brake member.

7. In a machine tool for taking contour cuts; a frame; a carrier revolvable with respect to said frame; at least one tool slide on said carrier movable in a generally planar path of travel; a cross slide carried by said tool slide movable in a generally planar path of travel substantially normal to the path of travel of said tool slide; a tool carried by said cross slide; first motion transmission means carried by said carrier engaging with said tool slide for controlling movement thereof; second motion transmission means, independent of said first motion transmission means and out of engagement therewith and with said tool slide, carried by said carrier and engaging with said cross slide for controlling movement thereof; a member on said frame engageable with said first motion transmission means to move the same and travel the tool slide; and a second member on said frame separate from said first member engageable with said second motion transmission means to move the same and travel the cross slide on said tool slide independently of any motion of said tool slide.

8. In a machine tool for taking contour cuts; a frame; a carrier revolvable with respect to said frame; means for driving said carrier; at least one tool slide on said carrier movable linearly thereon; a cross slide carried by said tool slide movable linearly thereon in a path normal to the travel of said tool slide; a tool carried by said cross slide; first motion transmission mechanism carried by said carrier and engaging with said tool slide for controlling movement thereof; second motion transmission mechanism, carried by said carrier out of operative engagement with said tool slide and first motion transmission means, engaging with said cross slide to control movement thereof; a cam surface fixed on said frame and having operative engagement with said first motion transmission means for moving the same on movement of said carrier relative to the frame; and a second cam surface fixed on said frame and having operative engagement with said second motion transmission means maving the same on movement of said carrier relative to the frame.

9. In a machine tool for taking contour cuts, a frame, a carrier revolvable on said frame, a plurality of work supporting spindles on said carrier, tool slides on said carrier adjacent the spindles movable in a linear path of travel, tool cross slides carried by said slides movable on said slides in a linear path of travel substantially normal to the path of travel of said slides, means on said frame driving said spindles, means controlling said tool slides for feeding the tool slides toward the work holding spindles and returning the same, and means actuated by revolution of said carrier and independent of said means controlling said tool slides for moving said tool cross slides relative to the tool slides while said tool slides are moving to achieve a contour cut.

10. In a machine tool, a frame, a carrier rotatably mounted on the frame, a plurality of circumferentially spaced work supporting spindles on said carrier, tool slides on said carrier adjacent the spindles movable in a linear path of travel, tool cross slides carried by said slides and movable on said slides in a linear path of travel substantially normal to the path of travel of said slides, independent cams fixed on said frame, means controlled by said cams in engagement with said tool slides to control the movement thereof, means, independent of said latter means, for moving said tool cross slides only, and means driving said spindles.

11. In a machine tool for taking contour cuts; a frame; a carrier movable with respect to said frame; at least one slide on said carrier movable in a generally linear path of travel; a cross slide carried by said first slide movable in a linear path of travel substantially normal to the path of travel of said first slide; a tool; tool supporting means; work piece supporting means; means supporting one of said supporting means on said cross slide; first motion transmission means carried by said carrier engaging with said first slide for controlling movement thereof; second motion transmission means independent of said first motion transmission means and out of engagement therewith and with said first slide carried by said carrier and engaging with said cross slide for controlling movement thereof; and separate cams mounted on said frame so that said carrier has movement relative thereto engaged with said first motion transmission means and with said second motion transmission means respectively to move the first slide and cross slide separately and independently.

References Cited in the file of this patent

UNITED STATES PATENTS

| | | |
|---|---|---|
| 1,264,197 | McGregor et al. | Apr. 30, 1918 |
| 1,574,726 | Bullard | Feb. 23, 1926 |
| 1,715,385 | Pinkey | June 4, 1929 |
| 1,743,862 | Morris | Jan. 14, 1930 |
| 1,782,138 | Davis | Nov. 18, 1930 |
| 1,971,537 | Sloan | Nov. 20, 1931 |
| 2,035,043 | Bullard | Mar. 24, 1936 |
| 2,042,502 | Bullard | June 2, 1936 |
| 2,165,774 | White | July 11, 1939 |
| 2,356,028 | Bullard | Aug. 15, 1944 |
| 2,425,170 | Wunsch et al. | Aug. 5, 1947 |
| 2,606,359 | Stadhaus | Aug. 12, 1952 |
| 2,713,283 | Lomazzo | July 19, 1955 |